Nov. 8, 1938.　　　　P. T. KLIX　　　　2,135,819

ADJUSTABLE CHAMFERING TOOL AND HOLDER

Filed Sept. 15, 1936

INVENTOR.
Paul T. Klix
BY Bodell & Thompson
ATTORNEYS.

Patented Nov. 8, 1938

2,135,819

UNITED STATES PATENT OFFICE 2,135,819

ADJUSTABLE CHAMFERING TOOL AND HOLDER

Paul T. Klix, Syracuse, N. Y., assignor to W. C. Lipe, Inc., Syracuse, N. Y., a corporation of New York Application September 15, 1936, Serial No. 100,913

3 Claims. (Cl. 90—16)

This invention has for its object a chamfering tool and holder for chamfering the end edges of gear teeth, particularly spiral gear teeth, or for chamfering or cutting off the corner of each tooth from the crown to the root where the side or flank of the tooth meets the end face at an acute angle, and particularly a tool by which the chambering operation is performed while the gear is being rotated with the corner being cut moving relative to the cutter as approaching or moving away from the cutter or tool, as the gear and the tool rotate about axes at an angle to each other, the tool rotating about an axis extending in a generally tangential direction to the gear.

It further has for its object, a tool and holder by which the tool is capable of a fine, rotary adjustment relatively to the holder to locate its cutting edge initially, and after sharpening operation in a proper radial position to cut the corner of the tooth as it is moving relative to the cutter, and further a tool which is adjustable radially to maintain the cutting edge in position to chamfer from the root to the crown, or cut off the corner while the gear and the tool are being rotated. As is well known, it is necessary, or at least highly desirable, to chamfer or cut off the end corners of gear teeth.

The invention consists in the tool and tool holder hereinafter described and claimed.

In describing this invention, reference is had to the accompanying drawing in which like characters designate corresponding parts in all the views.

Figure 1:
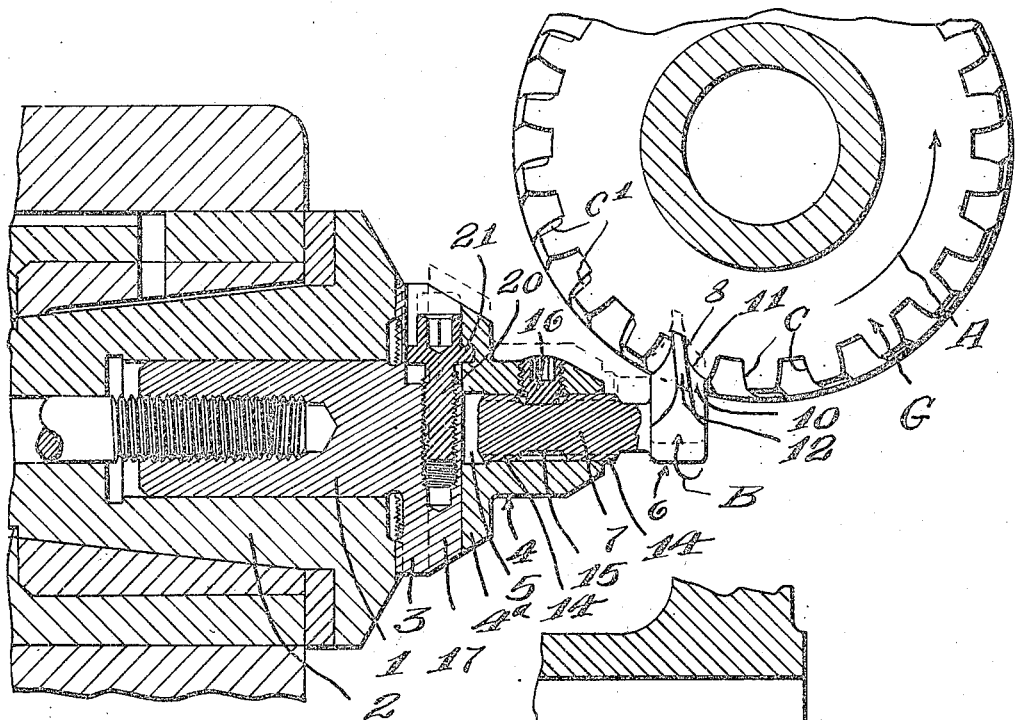
Figure 1 is a longitudinal, sectional view of this tool and tool holder, the contiguous portion of a chuck and of a gear being operated on being also shown.
Figures 2, 3:
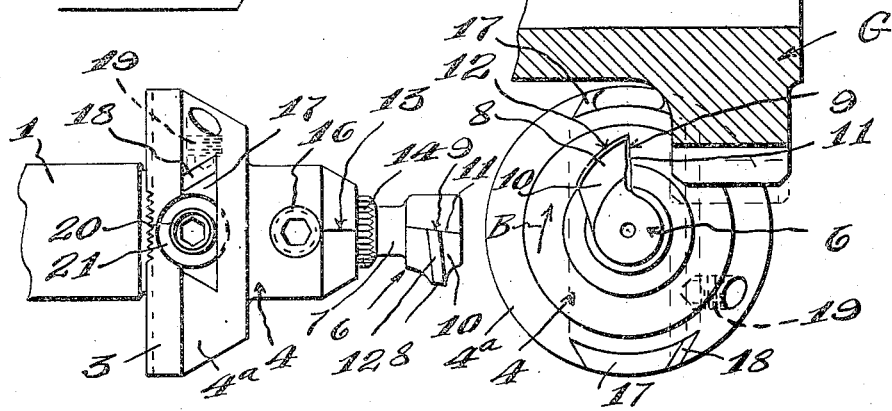
Figure 2 is an end elevation of a tool holder and tool, the contiguous portion of the gear being operated on being shown.
Figure 3 is an elevation, partly broken away, of the tool and tool holder.

This chamfering tool and holder comprises, generally, a rotatable body having an axial socket, a tool having a shank accurately fitting the socket, and a cutter tooth having its cutting edge extending radially, means for adjusting the tool relative to the holder about the axis of the tool to bring the cutting edge in a predetermined substantially radial position, and means for adjusting the tool bodily radially to shift the cutting edge radially or in a radial plane containing the axis of the tool. The tooth is of tapering contour from its apex toward its base. It is adjusted to cut from the base to the crown of the tooth. The last or radial offsetting or adjustment is to position the cutting edge as it is ground off or sharpened, so that it will cut off or chamfer the corner from the base to the crown of the gear tooth.

The rotatable body comprises a shank 1 for mounting in a suitable chuck 2, the body having a head 3 and a carriage 4 mounted on the head and adjustable radially relatively to the head 3, the carriage 4 being formed with an axial socket 5 for receiving the shank of the tool.

6 designates the tool, this being formed with a shank 7 fitting the socket, and a radially extending cutter tooth 8 at one end. The cutter tooth is provided with a face 9 at its advance end, with respect to the direction of rotation, and with a groove 10 in its lateral side face, the groove 10 meeting the face 9 and forming the cutting edge at 11. The tooth is thus tapering in contour, in cross section, and tapers from its apex toward its base. The apex end 12 of the cutter head extends in a curve, is arcuate, and recedes from the cutting edge end toward the rear end of the tooth. The groove 10 is concave so that the cutting edge 11 has something of the tapering contour of one side face of the gear tooth. The face 9 is ground so that it extends radially relatively to the axis of the shank 7 of the tool, and initially occupies a position substantially in line with the gauge line 13 on the carriage 4. As the face 9 is ground off for sharpening, it is necessary to reset the tool 6 in the socket 5, so that the face 9 lines up with the gauge mark 13. In order to effect this adjustment, which is necessarily a fine one, the socket 5 and the shank 7 of the tool are provided with means slidably interlocking by relative axial movement into any one of a plurality of radial positions. As here shown, this means consists of fine internal teeth or splines on the bore of the socket 5, and complemental splines 14 on the shank 7. These splines are interrupted as at 15 intermediate of the shank for providing a smooth surface with which a set screw 16 coacts to hold the shank 7 from axial displacement.

As the face 9 is ground off for sharpening, and hence is farther back on the receding arc 12 of the outer end of the cutting tooth, the cutting edge 11 becomes correspondingly shorter and hence, in order to chamfer the full height of the gear tooth, the shortening of the cutting edge 11 must be compensated for and also, at the same time, the contour of the cutting edge maintained.

In order to compensate for the shortening of the cutting edge, and to maintain the contour thereof with respect to the gear tooth being operated on, means is provided for adjusting the carriage 4 and hence, the entire tool radially relatively to the head 3.

In the illustrated embodiment of my invention, the head 3 and the base 4ª of the carriage 4 are provided with interfitting ways or guides, the base 4ª of the socket member being here shown as formed with a dove-tail groove, and the head with a tenon or way 17 extending into the groove and held to a close accurate fit therein by a gib 18 which can be tightened and loosened by means of screws 19. The interfitting guides of the head 3 and base 4ª extend diametrically of the shank 1, and the carriage 4 is shifted radially or diametrically of the head 3 parallel to or coincident with the radial plane of the cutting edge 11. It is shifted in any suitable manner, as by a screw 20 threading into the head 3 and having a flange 21 interlocking in a groove in the base 4ª of the socket member 4.

The movement of the base 4ª, or carriage 4, is in the radial plane of the gauge mark 13, or a radial plane approximately that which the face 9 of the cutter should occupy. Thus, as the face 9 is ground, or the cutting edge 11, it can be set in the proper radial position by sliding the tool out of the socket, and turning it until the face 9 lines up with the gauge mark 13, and can also be set to the proper height to cut or chamfer the corner of the gear tooth from root to crown by turning the screw 20.

Thus, while the gear G is rotating in the direction of the arrow A, Figure 1, the end of the tool is rotating in the direction of the arrow B, the cutting edge 11 cuts off the corner C, as shown in C', and owing to the adjustment of the tool about its axis relatively to the tool holder, and the radial adjusting or offsetting of the cutter by means of the screw 20, the cutting edge 11 of the tool can be accurately positioned to chamfer or remove the corner C while the gear is rotating and the gear tooth corner receding from the tool. It will be understood that in chamfering machines in which this tool holder is used, the tool holder and the gear are rotated in a certain synchronism, the tool rotating about an axis extending in a general tangential direction to the gear. Usually two tools are used, arranged opposite to each other, for chamfering the corners at opposite ends of the gear tooth at the same time.

What I claim is:

1. An adjustable chamfering tool and holder comprising a rotatable body having an axial socket, and a tool having a radially extending cutter tooth of tapering contour in cross section from its end toward its base, and with a cutting edge at the corner by one side face and the advance side of the tooth with respect to the direction of rotation, the end edge of the tooth extending in a curve receding from the cutting edge end of the tooth toward the axis of the tool, and means for adjusting the tool about its axis relative to the holder to bring the cutting edge into substantially radial position as the tooth is sharpened, and means for adjusting the cutter bodily radially in substantially the radial plane of the cutting edge containing the axis of the tool.

2. An adjustable chamfering tool and holder comprising a rotatable body having an axial socket, and a tool having a radially extending cutter tooth of tapering contour in cross section from its end toward its base, and with a cutting edge at the corner by one side face and the advance side of the tooth with respect to the direction of rotation, the end edge of the tooth extending in a curve receding from the cutting edge end of the tooth toward the axis of the tool, and means for adjusting the cutter bodily radially in substantially the radial plane of the cutting edge containing the axis of the tool.

3. An adjustable chamfering tool and holder comprising a rotatable body formed with a head and a carriage adjustable radially relatively to the head and formed with an axial socket, a tool having a shank fitting the socket and a cutter head having a cutting edge extending radially at an angle from the shank in a direction paralleling the radial movement of the carriage, the shank of the tool and the socket of the carriage having means for holding the shank in any one of a plurality of radial positions to locate the cutting edge in a predetermined radial position, and means for adjusting and holding the carriage in its radially adjusted position.

PAUL T. KLIX.